United States Patent [19]
Elias et al.

[11] 4,354,018
[45] Oct. 12, 1982

[54] POLYESTERS OF 3-(PARA-HYDROXYPHENYL)PROPIONIC ACID

[75] Inventors: Hans-G. Elias, Midland, Mich.; Robert J. Warner, Racine, Wis.

[73] Assignee: Michigan Molecular Institute, Midland, Mich.

[21] Appl. No.: 344,548

[22] Filed: Feb. 1, 1982

[51] Int. Cl.$^3$ .................... C08G 63/06; C08G 65/38
[52] U.S. Cl. .................................... 528/206; 528/207
[58] Field of Search ............................. 528/206, 207

[56] References Cited

U.S. PATENT DOCUMENTS 2,600,376  6/1952  Caldwell ........................ 260/47
4,230,817  10/1980  Charbonneau ................. 528/206

OTHER PUBLICATIONS

Chem. Abstr. 55, 3589b (1961) LIX. Polyester, T. Kametani and K. Fukumoto.
Encyclopedia of Polymer Science & Technology, vol. 15, pp. 292–306, esp. pp. 292–294 and 306 (1971), Interscience Publ., New York; Authors: J. Economy & S. G. Cottis.
Makromol. Chem. 182, 681–686 (1981); Hans-G. Elias & Robert J. Warner, "Polyesters by Thionyl Chloride Activted Polycondensation".

Primary Examiner—Lester L. Lee
Attorney, Agent, or Firm—William Miller Yates

[57] ABSTRACT

A resinous linear polyester, poly(oxy-1,4-phenylene-3-oxotrimethylene), is made by the self-condensation of 3-(parahydroxyphenyl)propionic acid. The process is carried out interfacially or in an inert solvent by mixing 3-(parahydroxyphenyl)propionic acid with at least an equimolar proportion of thionyl chloride and maintaining the mixture at a reaction temperature for a time sufficient to allow substantially complete autocondensation. A base may be added in proportion at least about equivalent to the thionyl chloride. The autocondensate when purified is a white solid linear polyester not melting up to 360° C. and may exhibit an intrinsic viscosity of at least 75 ml/g. It may be molded or pressed into a film.

Co-condensed polyesters of 3-(parahydroxyphenyl)propionic acid with up to an equimolar proportion of parahydroxyphenylacetic acid may similarly be prepared.

8 Claims, No Drawings

POLYESTERS OF 3-(PARA-HYDROXYPHENYL)PROPIONIC ACID

FIELD OF THE INVENTION

The invention relates to resinous linear polyesters of 3-(parahydroxyphenyl)propionic acid and to a method for preparing them.

PRIOR ART

Linear polyesters have long been prepared by the self-condensation of aromatic hydroxycarboxylic acids in which both the hydroxyl and carboxyl groups are directly attached to the benzene nucleus. Self-condensation proceeds under the influence of an acidic agent such as thionyl chloride (German Pat. No. 344,034 (1920)). When the hydroxyl and carboxyl groups are in a position ortho to one another, the polyesters are of relatively low molecular weight. Higher molecular weight resins may be made from meta- and parahydroxybenzoic acids by means of special catalysts (U.S. Pat. No. 2,600,376 (1952)). By another method involving blocking of the carboxyl group, parahydroxybenzoic acid polymers are made on a commercial scale as engineering plastics of unusual inertness (Encyclopedia of Polymer Science and Technology, Vol. 15, p. 292–306, Interscience Publ., New York, 1971). None of these methods has been applied to the self-condensation of an aromatic hydroxycarboxylic acid in which the carboxyl group is in an aliphatic sidechain.

SUMMARY OF THE INVENTION

A resinous linear polyester, poly(oxy-1,4-phenylene-3-oxotrimethylene), is made by the self-condensation of 3-(parahydroxyphenyl)propionic acid, using thionyl chloride as activator. Cocondensed polyesters of 3-(parahydroxyphenyl)propionic acid with up to an equimolar proportion of (parahydroxyphenyl)acetic acid may similarly be prepared.

DESCRIPTION OF THE INVENTION

In producing the new polyesters, 3-(parahydroxyphenyl)propionic acid, $C_9H_{10}O_3$, is mixed with at least an equimolar proportion of thionyl chloride. The mixture is maintained at a reaction temperature for a time sufficient to allow substantially complete autocondensation of the hydroxyacid to a resinous polyester. Hydrogen chloride and sulfur dioxide form during the condensation and are removed as formed. Any excess thionyl chloride is then boiled off or otherwise separated. There remains the desired self-condensed linear polyester in the form of a powder. It may be washed to purify it and then dried as product.

The reaction may be formulated:

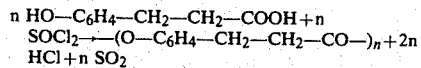

where n is the number of monomeric units in the autocondensed polymer.

The linear polyester $(C_9H_8O_2)_n$ is a solid white powder, a resinous material of high molecular weight. When made under preferred conditions it exhibits an intrinsic viscosity $[\eta]$ of at least 75 milliliters per gram up to 100 ml/g or more. On heating, the powder undergoes a phase transition around 70° C., begins to discolor at about 175° C., and becomes dark brown at 210° C. It does not melt up to 360° C., the highest value reached in testing. The new polyester, both in powder and in molded form, is chemically inert and resistant to most common solvents. It will dissolve slowly at 30° C. in a 3:2 volume ratio mixture of phenol and sym. tetrachloroethane.

The new autocondensate is presumably a mixture of polymeric chains all corresponding to the formula above but with the chain length differing somewhat from molecule to molecule. The value of n would thus be an average, when measured. It is also probable that most chains are terminated at the ends by a hydrogen and a chlorine atom, nearly undetectable because of the high molecular weight.

Because of their inertness and heat resistance, the new polymers of the invention have promise as engineering plastics and films. They may be shaped into useful objects by heating in powder form to 200° C. and applying high pressure, causing the powder to coalesce to a coherent mass. When thus pressed between parallel plates at a pressure well above 1000 atmospheres, it is converted to a translucent continuous film useful as a wrapping material. By virtue of moldability, solubility in some solvents, and ability to form films, the new polyesters offer practical advantage over the known parahydroxybenzoic acid autocondensed polymers.

While the invention is directed primarily to making homopolymers of 3-(parahydroxyphenyl)propionic acid as described, co-condensates of the monomer with up to an equimolar proportion of parahydroxyphenylacetic acid may be made by the same procedure. Properties and usefulness are similar to those of the homopolymers.

The 3-(parahydroxyphenyl)propionic acid monomer which is selfcondensed in the invention is a compound known in the art (cf. Beilstein Handbuch, orig. Vol. 10, p. 244, and 2nd supp., Vol. 10, p. 145). For applicants' work it was made by conventional catalytic hydrogenation of parahydroxycinnamic acid. When recrystallized from toluene, the monomer was a white powder melting at 131° C. The parahydroxycinnamic acid intermediate is an article of commerce. It may be produced in known manner either from parahydroxypyruvic acid, a degradation product of lignin, or from coniferyl alcohol, produced in vivo by enzymatic treatment of glucose. (Cf. "Macromolecules", by Hans-G. Elias, Vol. 2, p. 1109, Plenum Press, New York, 1977.) Thus the ultimate raw material from which the polyesters of the invention are made be lignin or glucose. Both are readily derivable by well known processes from wood and other renewable biosources. Accordingly, the new polyesters are an addition to the comparatively small number of useful plastic materials made without reliance on petroleum or other dwindling hydrocarbon resources.

In the self-condensation of 3-(parahydroxyphenyl)propionic acid by the method described briefly above, the reaction with thionyl chloride may be carried out interfacially, i.e. without solvent or diluent. Interfacial reaction is advantageous in that it is tolerant of impurities in the starting materials and that an adequate yield of polymer is achieved even when the reactants are not present in stoichiometric proportions. Alternatively, however, the self-condensation may be conducted in an inert solvent for the 3-(parahydroxyphenyl)propionic acid, such as methylene chloride, chloroform, sym.

tetrachloroethane, tetrahydrofuran, ortho-dichlorobenzene, or diethyl ether. The identity of the solvent has some effect on the molecular weight of the polyester product. Highest values appear to be realized with chloroform and with tetrahydrofuran, alone or mixed with ortho-dichlorobenzene.

The self-condensation of 3-(parahydroxyphenyl)propionic acid in the presence of thionyl chloride proceeds satisfactorily at temperatures in the range 15° to 150° C. Evolution of hydrogen chloride is essentially over in two or three hours. Longer times, up to 16 or 20 hours, are preferred to assure completion of polyesterification to maximum molecular weight. If desired, the hydrogen chloride and sulfur dioxide may simply be allowed to vaporize out of the reacting mixture. However, completion of the polycondensation and removal of the hydrogen chloride and sulfur dioxide may advantageously be effected by carrying out the autocondensation in the presence of a base at least in a proportion about equivalent to the thionyl chloride. Suitable bases include N,N-dimethyl formamide, sodium hydride, pyridine, triethylamine, triethylenediamine, hexamethylphosphoric triamide, or mixtures of them.

While autocondensation according to the invention is preferably carried out in a single step as described, applicants have observed that the overall reaction appears to proceed by intermediate formation of the acid chloride 3-(parahydroxyphenyl)propionyl chloride, a highly reactive substance. At a temperature of 0° C. it may be isolated. On standing at room temperature, it spontaneously undergoes self-condensation to form the resinous polyesters of the invention. (See applicants' article at Makromol. Chem. 182, 681–686 (1981).)

The following examples further illustrate the invention.

EXAMPLE 1

To 3 grams (0.018 mol) of 3-(parahydroxyphenyl)propionic acid was added 3 milliliters (0.041 mol) of thionyl chloride. The mixture was heated for one hour at 40° C. until all solids had dissolved. Excess thionyl chloride was distilled off at 76° C. The solution became viscous after 15 minutes at 80° C. and solidified at this temperature after 30 minutes. Heating was continued for another hour until evolution of hydrogen chloride ceased. After cooling, there remained a white powder which was washed with water, then methanol, and dried at 60° C. The yield of polymer (poly(oxy-1,4-phenylene-3-oxotrimethylene), $C_9H_8O_2$) was 2.5 grams (94 percent of theoretical).

The product was analyzed conventionally for its content of carbon, hydrogen, and sulfur (impurity), with these results in percent by weight:

| Assumed Formula | C | H | S | |
|---|---|---|---|---|
| $(C_9H_8O_2)_n$ | 72.96 | 5.44 | 0 | calculated |
| $H(C_9H_8O_2)_{10}Cl$ | 71.20 | 5.38 | 0 | " |
| Product | 71.11 | 5.56 | 0.30 | found |

The intrinsic viscosity of the polyester measured at 25° C. in a mixture of phenol and tetrachloroethane (3:2) at a concentration of 2.5 grams per liter was $[\eta] = 16.3$ milliliters per gram.

A portion of the polyester powder was hot pressed into a thin film at 200° C. and 144 MPa (20,000 pounds per square inch). The infrared spectrum of the film, measured on standard equipment, was as follows: 3500 (w; OH), 3040 (m; arom. CH), 2950 (m; aliph. CH), 2880 (m; aliph. CH), 1745 (vs; CO, ester), 1605 (mw; arom.), 1505 (s; arom.), 1480 (m; CO, ester), 1450 (w; arom.), 1415 (mw), 1365 (m), 1290 (ms; COC), 1190 (s; 1,4-subst. arom.), 1160 (s; ester), 1120 (s; 1,4-subst. arom.), 920 (m), 860 (ms), 830 (arom.), 745 (m; 1,4-subst. arom.), and 670 (m). (The number is reciprocal wavelength (cm$^{-1}$). The first letters indicate strength, from weak (w) through medium (m) to very strong (vs). The final designation, when present, characterizes the vibration band.)

EXAMPLES 2 TO 12

Other polycondensations were carried out with 3-(parahydroxyphenyl)propionic acid and thionyl chloride, with and without various solvents and bases, and at several reaction temperatures and times. The results, in terms of percent yield of polyester, and the color and intrinsic viscosity of the polyester, are given in the following Table. Preferred products of high intrinsic viscosities from 75 to 100 (ml/g) were obtained in Examples 5 to 7. (Of the bases, DMF is dimethylformamide and Pyr is pyridine. Among the solvents, THF is tetrahydrofuran, and DCB is 1,2-dichlorobenzene.)

EXAMPLES 13 AND 14

Two polycondensations were carried out in a manner similar to that of the previous examples except that the starting material was an equimolar mixture of 3-(parahydroxyphenyl)propionic acid and parahydroxyphenylacetic acid. Results appear in the Table. (TCE is 1,1,2,2-tetrachloroethane.)

TABLE

| Example No. | $SOCl_2$ Monomer (mol/mol) | Base | Base $SOCl_2$ (mol/mol) | Solv. | Temp. °C. | Time hrs | Yield % | Color | $[\eta]$ ml/g |
|---|---|---|---|---|---|---|---|---|---|
| | | | 3-(parahydroxyphenyl)propionic acid | | | | | | |
| 1 | 2.3 | — | — | — | 80 | 1.8 | 94 | white | 16.3 |
| 2 | 1.0 | — | — | THF | 80 | 3 | 97 | white | — |
| 3 | 2.0 | — | — | — | 100 | 3 | 94 | white | 16 |
| 4 | 3.0 | — | — | — | 125 | 3 | 95 | orange | Insol. |
| 5 | 2.0 | DMF trace | — | $CHCl_3$ | 100 | 16 | 98 | white | 76 |
| 6 | 1.5 | NaH | 2.2 | THF | 0/100 | 20 | 99 | white | 75 |
| 7 | 1.5 | Pyr | 1.0 | THF/DCB | 17 | 20 | 75 | brown | 100 |
| 8 | 1.0 | Pyr | 1.0 | — | 40 | 16 | 35 | white | — |
| 9 | 1.0 | Pyr | 2.0 | $CH_2Cl_2$ | 40 | 16 | 85 | white | 10 |
| 10 | 1.4 | Pyr | 0.9 | $CH_2Cl_2$ | 40 | 16 | 41 | yellow | 38 |
| 11 | 1.4 | Pyr | 0.9 | $CH_2Cl_2$ | 40 | 16 | 78 | orange | 22 |
| 12 | 1.4 | Pyr | 0.9 | $Et_2O$ | 35 | 16 | 88 | off-white | 16 |
| | | | 3-(parahydroxyphenyl)propionic acid:parahydroxyphenylacetic acid (1:1) | | | | | | |

TABLE-continued

| Example No. | SOCl₂ Monomer (mol/mol) | Base | Base SOCl₂ (mol/mol) | Solv. | Temp. °C. | Time hrs | Yield % | Color | [η] ml/g |
|---|---|---|---|---|---|---|---|---|---|
| 13 | 1 | Pyr | 1 | CH₂Cl₂ | 40 | 16 | 95 | brown | 6.8 |
| 14 | 1 | Pyr | 1 | TCE | 146 | 16 | 85 | off-white | 13.4 |

We claim:

1. Resinous linear poly(oxy-1,4-phenylene-3-oxotrimethylene).

2. A solid linear polyester according to claim 1 made by the thionyl chloride-activated polycondensation of 3-(parahydroxyphenyl)propionic acid.

3. A polyester according to claim 2 characterized by an intrinsic viscosity of at least 75 ml/g and being a white solid not melting up to 360° C.

4. A film of the polyester according to claim 2.

5. A resinous linear polyester autocondensate of 3-(parahydroxyphenyl)propionic acid with up to an equimolar proportion of parahydroxyphenylacetic acid.

6. A method of making a resinous polyester which comprises mixing 3-(parahydroxyphenyl)propionic acid with at least an equimolar proportion of thionyl chloride, maintaining the mixture at a reaction temperature for a time sufficient to allow substantially complete autocondensation of the hydroxyacid to a resinous polymer, and recovering the latter from the reaction product.

7. A method according to claim 6 in which the autocondensation is carried out in the presence of a base in a proportion at least about equivalent to that of the thionyl chloride.

8. A method according to claims 6 or 7 in which the autocondensation is carried out in an inert solvent for the 3-(parahydroxyphenyl)propionic acid.

* * * * *